United States Patent [19]

Kohl

[11] 4,396,594

[45] Aug. 2, 1983

[54] SULFUR DIOXIDE REDUCTION PROCESS

[75] Inventor: Arthur L. Kohl, Woodland Hills, Calif.

[73] Assignee: Rockwell International Corporation, El Segundo, Calif.

[21] Appl. No.: 335,002

[22] Filed: Dec. 28, 1981

[51] Int. Cl.³ .................... C01B 17/02; C01B 17/00
[52] U.S. Cl. ............... 423/569; 423/210.5; 423/244; 423/512 A; 423/561 A; 423/570; 423/DIG. 12
[58] Field of Search ............ 423/569, 570, 561, 210.5, 423/DIG. 12, 244, 512 A

[56] References Cited

U.S. PATENT DOCUMENTS

| | | | |
|---|---|---|---|
| 3,170,766 | 2/1965 | Townsend | 23/263 |
| 3,438,733 | 4/1969 | Grantham et al. | 423/210.5 X |
| 3,441,379 | 4/1969 | Renault | 23/226 |
| 3,447,903 | 6/1969 | Wiewiorowski | 23/226 |
| 3,524,720 | 8/1970 | Bauer | 423/561 A X |
| 3,647,358 | 3/1972 | Greenberg | 423/DIG. 12 |
| 3,904,387 | 9/1975 | Kertamus et al. | 48/210 |
| 3,932,586 | 1/1976 | Guerrieri | 423/242 |
| 4,095,953 | 6/1978 | Gutterman et al. | 23/277 R |

FOREIGN PATENT DOCUMENTS 1535970  12/1978  United Kingdom ....... 423/DIG. 12

Primary Examiner—Gregory A. Heller
Attorney, Agent, or Firm—Henry Kolin; Michael A. Kondzella; H. Fredrick Hamann

[57] ABSTRACT

Sulfur dioxide is converted to elemental surfur by reduction with a carbonaceous material in a reaction zone containing a molten salt. Heat is provided by reacting a portion of the carbonaceous material with oxygen. In a preferred embodiment alkali metal sulfates present in the molten salt are reduced to alkali metal sulfides.

12 Claims, 1 Drawing Figure

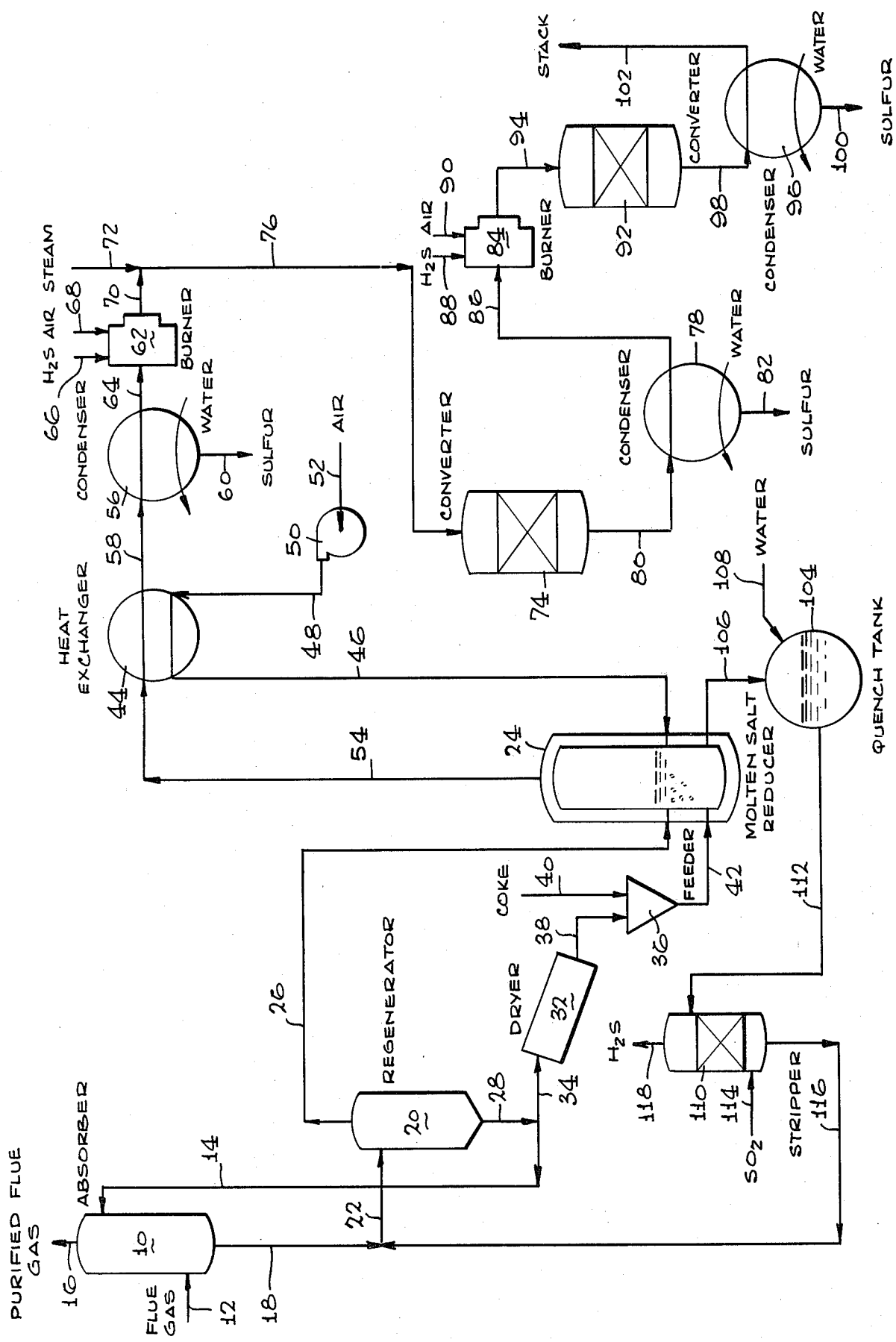

SULFUR DIOXIDE REDUCTION PROCESS

BACKGROUND OF THE INVENTION

1. Field of the Invention

The present invention relates to a process for the production of elemental sulfur from sulfur dioxide. In one of its more particular aspects, this invention relates to the reduction of sulfur dioxide to elemental sulfur by a carbonaceous material in the presence of a molten salt. In another aspect this invention relates to the simultaneous reduction of sulfur dioxide to elemental sulfur and an alkali metal sulfate to the corresponding alkali metal sulfide. The simultaneous reduction of the sulfur dioxide and sulfate is desirable in flue gas desulfurization processes wherein some sulfate is unavoidably produced along with the sulfite-bisulfite compounds from which the sulfur dioxide is regenerated.

2. Prior Art

The need to eliminate sulfur-containing gases from flue gases has resulted in many different methods being suggested for this purpose. In some of these methods the flue gases are desulfurized without recovering any of the sulfur values in usable form. In other words, processes have been provided to recover the sulfur values as either hydrogen sulfide or elemental sulfur. In those processes recovering the sulfur values as hydrogen sulfide, the hydrogen sulfide thereby produced is generally utilized either in a sulfuric acid producing plant or a Claus plant for the production of sulfur.

Thus the conversion of sulfur-containing compounds involved in flue gas desulfurization to elemental sulfur has achieved some importance as the need for environmental clean-up has grown.

U.S. Pat. No. 3,438,733 describes a process for producing sulfur by reducing molten alkali metal sulfite with carbon. The alkali metal sulfite is formed by absorption of sulfur dioxide using a molten alkali metal carbonate as an absorbent. The process is conducted by trickling the molten alkali metal sulfite in admixture with molten alkali metal carbonate over a solid carbonaceous bed, with the sulfur thereby produced being recovered in the form of gaseous elemental sulfur. Although elemental sulfur is produced in this process, it is necessary to operate the reactor at relatively high pressures in order to convert the sulfite to elemental sulfur and to minimize the formation of alkali metal sulfide.

U.S. Pat. No. 3,904,387 discloses a process in which sulfur dioxide and carbon are heated together to produce a gaseous mixture of carbon monoxide and elemental sulfur. The process is carried out in a gasifier into which hot carbonaceous matter and a heated stream of concentrated sulfur dioxide are introduced. This process thus requires extensive heating of all carbonaceous matter and the sulfur dioxide.

U.S. Pat. No. 4,095,953 describes a modular system for reducing sulfur dioxide which consists of a plurality of compartments having coal inlets associated with each compartment and a single source of sulfur dioxide. In this modular system it is required that burners be situated in each compartment in order to heat the reactants to the proper reaction temperature, namely one between 1100° and 1550° F. (about 595° to 845° C.).

Other processes in which sulfur is formed directly from sulfur dioxide utilize hydrogen sulfide as a reactant.

For example, in U.S. Pat. No. 3,170,766 there is disclosed a process which involves the reaction of hydrogen sulfide with sulfur dioxide in an organic solvent to produce sulfur as the product of the reaction.

U.S. Pat. No. 3,441,379 discloses a similar process in which the reaction of hydrogen sulfide and sulfur dioxide is carried out in a liquid phosphoric acid ester as the reaction medium.

In U.S. Pat. No. 3,447,903 the reaction of hydrogen sulfide and sulfur dioxide is carried out in liquid sulfur in the presence of a catalyst comprising a basic nitrogen compound.

None of the processes in which hydrogen sulfide is used to convert sulfur dioxide to elemental sulfur are particularly desirable for the reduction of sulfur dioxide recovered from flue gas streams since each requires a source of hydrogen sulfide gas, which is not normally available at the site of flue gas desulfurization plants.

Other processes are known in which the production of sulfur from sulfur dioxide requires that the sulfur dioxide be first reduced to hydrogen sulfide. For example, U.S. Pat. No. 3,932,586 discloses such a process in which sulfur dioxide is absorbed in an aqueous absorption solution including potassium carbonate, and the resulting potassium sulfite or sulfate is treated to regenerate potassium carbonate with the release of hydrogen sulfide, which can then be converted to elemental sulfur by processing in a Claus plant or other sulfur recovery unit. This process has the disadvantage that several intermediate steps are required to produce sulfur from sulfur dioxide.

OBJECTS OF THE INVENTION

It is an object of the present invention to provide a process for producing elemental sulfur from sulfur dioxide in high yields with a minimum number of process steps.

Another object of this invention is to provide such a process which results in a minimum number of by-products requiring disposal.

Another object is to provide a means for producing elemental sulfur from sulfur dioxide which uses a low cost carbonaceous material as the reducing agent in a simple compact reactor.

Another object of this invention is to provide a means for the simultaneous reduction of sulfur dioxide and alkali metal sulfates.

Another object of this invention is to provide a process which can utilize the sulfur dioxide absorbed from flue gases to produce elemental sulfur.

Another object of this invention is to provide a means for simultaneously reducing the sulfur dioxide absorbed from a flue gas to elemental sulfur and for regenerating the absorbent used in the absorption of such sulfur dioxide.

Other objects and advantages of the present invention will be apparent in the course of the following detailed description.

SUMMARY OF THE INVENTION

In accordance with the broad aspects of the present invention, sulfur dioxide is reduced to elemental sulfur by reaction with carbonaceous material in the presence of a molten salt. Heat is provided for the reaction and for the purpose of maintaining the temperature above the melting point of the salt by reacting additional carbonaceous material with oxygen. The elemental sulfur is condensed from the gaseous product stream resulting from reactions between the sulfur dioxide, carbonaceous material and oxygen gas in a molten salt reducer which contains the molten salt. In a preferred embodiment, the source of the sulfur dioxide feed is the regeneration step of a flue gas desulfurization system which uses an alkali metal sulfite as the active absorbent. Any alkali metal sulfate produced in the flue gas desulfurization system is also reduced in the molten salt reducer resulting in regeneration of the absorbent.

The invention will be more clearly understood by reference to the detailed description of certain preferred embodiments which follows, taken in connection with the accompanying drawing.

BRIEF DESCRIPTION OF THE DRAWING

The sole FIGURE of the drawing shows a schematic flow diagram illustrating a preferred embodiment of the process of the invention in which the source of the sulfur dioxide is a regenerative sulfur dioxide absorption system.

DESCRIPTION OF THE PREFERRED EMBODIMENTS

The present invention provides a process for converting gaseous sulfur dioxide to elemental sulfur using a molten salt as the reaction medium and carbonaceous material as the reactant. The principal overall reaction occurring in the molten salt reducer is the following:

$$SO_2 + 2C \rightarrow S + 2CO \tag{1}$$

Hydrogen in the carbonaceous material can also react with the sulfur dioxide feed to form additional elemental sulfur or hydrogen sulfide by reactions 2 and 3:

$$4H + SO_2 \rightarrow S + 2H_2O \tag{2}$$

$$6H + SO_2 \rightarrow H_2S + 2H_2O \tag{3}$$

In addition, side reactions result in the formation of carbonyl sulfide and carbon disulfide. These reactions are illustrated in the following equations:

$$S + CO \rightarrow COS \tag{4}$$

$$2S + C \rightarrow CS_2 \tag{5}$$

The reactions illustrated above occur in a reaction zone containing a molten salt, which may consist of an alkali metal sulfide or a mixture of salts with an appropriate melting point. A mixture is preferred in order that the temperature at which the molten salt reaction zone must be maintained to keep the salts in molten condition is lower than the melting point of, for example, pure sodium sulfide which melts at about 1180° C. Particularly preferred is a mixture of sodium and potassium sulfides. Use of this mixture permits operation well below the freezing point of pure sodium sulfide. The presence of other anions in the melt, for example, polysulfides, carbonates, sulfites, sulfates, hydroxides and silicates is also effective in lowering the melting point and some of these will normally be present due to side reactions and impurities in the feed materials. Alternatively, non-reactive salts such as sodium chloride may be used to lower the melting point or increase fluidity at the reaction temperature.

The composition of the molten salt may in certain circumstances be affected by the composition of salts used in the stages preceding the molten salt reducer, that is, the stages resulting in the provision of a sulfur dioxide stream. For example, where sodium sulfite is used to absorb sulfur dioxide from flue gases, sodium sulfite, sodium thiosulfate, sodium bisulfite and sodium sulfate are among the compounds which may be present in the spent absorbent or the regenerated absorbent, in those cases in which the absorbent is regenerated. Use of these salts as feed to the molten salt reactor generally provides the necessary environment for the occurrence of the desired reduction reactions. In an especially preferred embodiment sodium sulfate is continuously fed to the molten salt reducer during operation in order to provide the requisite salt mixture.

The temperature of the molten salt reaction zone is maintained above the melting point of the salts present. In particular, temperatures in the range of about 850° to 1250° C. have been found desirable, with temperatures in the range of about 900° to 1100° C. being preferred.

The temperature of the molten salt reaction zone is maintained by oxidizing a portion of the carbonaceous material feed. The oxidation of carbon to carbon monoxide and carbon dioxide is illustrated in Equations 6 and 7.

$$2C + O_2 \rightarrow 2CO \tag{6}$$

$$C + O_2 \rightarrow CO_2 \tag{7}$$

These reactions are highly exothermic and can readily be utilized to provide the requisite heat to maintain the temperature of the molten salt reaction zone.

The sulfur dioxide to be reduced in the molten salt reducer may be provided from any number of gas streams containing sulfur dioxide, principally, concentrated sulfur dioxide streams. One of the most common sources of sulfur dioxide is from flue gas desulfurization processes in which gaseous sulfur dioxide is absorbed from a flue gas by means of a suitable absorbent. In subsequent processing the resultant absorbate containing the sulfur dioxide values in the form, for example, of an alkali metal bisulfite, is treated to provide a concentrated sulfur dioxide stream and regenerated alkali metal sulfite. The sulfur dioxide stream is fed to the molten salt reducer in gaseous form.

An oxidizing gas, for example, air, oxygen or oxygen enriched air is also fed to the reducer in gaseous form. The function of the oxidizing gas, as pointed out above, is to oxidize a portion of the carbonaceous material which serves as the reductant for the sulfur dioxide in order to provide sufficient heat to sustain the reaction and maintain the salts in molten form.

The principal reduction for the sulfur dioxide is carbon. It may be provided in the form of a carbonaceous material which is preferably fed as a dry solid with the sulfur dioxide or the oxidizing gas. Petroleum coke is preferred for this purpose. Other forms of carbonaceous materials which may be used include coal, petroleum products, lignite or wood.

Make-up salt for the molten salt reaction zone is also preferably fed as a dry material. For example, dry alkali metal sulfates or thiosulfates may be used for this purpose. Under the conditions of operation of the molten salt reactor in the process of this invention, the sulfates or thiosulfates are converted to sulfides as illustrated in Equations 8, 9, 10 and 11

$$M_2SO_4 + 2C \rightarrow M_2S + 2CO_2 \tag{8}$$

$$M_2SO_4 + 4C \rightarrow M_2S + 4CO \tag{9}$$

$$2M_2S_2O_3 + 3C \rightarrow 2M_2S + 2S + 3CO_2 \tag{10}$$

$$M_2S_2O_3 + 3C \rightarrow M_2S + 3CO + S \tag{11}$$

where M is an alkali metal ion.

In cases where the process is used only to treat sulfur dioxide and not to reduce alkali metal sulfate at the same time, little or no salt make-up is required, and the molten salt mixture composition is determined by the composition of the make-up used. If alkali metal carbonates are used as make-up these are converted to the sulfides by such reactions as illustrated in Equation 12:

$$2M_2CO_3 + 2SO_2 + 3C \rightarrow 2M_2S + 5CO_2 \tag{12}$$

If, on the other hand, relatively inert salts such as alkali metal chlorides are used as make-up, these remain in the molten salt reaction zone in relatively unchanged chemical form.

The advantage of using the salts in dry solid form is that thereby the necessity of drying an aqueous solution of the salt or salts is obviated, which reduces the amount of heat energy which must be expended in the molten salt reducer, thereby reducing the amount of carbonaceous material in excess of that required for reaction with the sulfur dioxide which must be fed to the molten salt reducer. If, however, it is desired to use an aqueous solution of the salt as feed, then it is simply necessary to use a larger excess of carbonaceous material than would otherwise be required, in order to vaporize the water from the aqueous solution fed to the molten salt reducer.

The carbonaceous material is fed to the molten salt reducer in excess of the amount required to reduce the sulfur dioxide in order to provide sufficient fuel for oxidation by the oxygen containing gas for the production of heat to keep the molten salt reducer at the desired temperature, as indicated above.

The oxygen containing gas is used in an amount sufficient to oxidize the excess carbonaceous material.

The make-up salt is introduced into the molten salt reducer in an amount sufficient to maintain the desired salt inventory in the molten salt reducer, allowing for any molten salt which may be drained from the system for use in various stages of the sulfur dioxide absorption process, for example, and to make up the loss of any salts which may be entrained in the gases produced in the reactions occurring in the molten salt reducer.

Reaction between the carbonaceous material and sulfur dioxide fed to the molten salt reaction zone results in gaseous products. Other reactions occurring between the components of the feed materials may result in other gaseous products or products which remain in the molten salt. The gaseous products escape from the surface of the molten salt and are further processed in order to recover elemental sulfur in liquid form. These gaseous products, in addition to gaseous sulfur, include carbon monoxide, carbon dioxide, nitrogen, if air is used as the oxidizing gas, carbonyl sulfide, and carbon disulfide. If, as is typically the case, the carbonaceous feed contains some hydrogen, or moisture is present in any of the feed streams, the product gas stream will also contain hydrogen containing compounds such as hydrogen sulfide, water and hydrogen. The gaseous products exit the molten salt reducer as a hot gas which is processed to recover sulfur therefrom.

Typically, the gas processing includes steps to remove entrained particles of melt, recover useful heat, condense elemental sulfur by cooling, reheat the gas to an appropriate catalytic reactor feed temperature, and generate additional elemental sulfur from gaseous components by catalysis. These steps may be repeated several times in order to ensure the removal of as much of the sulfur-containing by-products of the reduction reaction as possible as well as to increase the recovery of elemental sulfur. It is preferred to continue the processing until the gas contains less than about 15% of the sulfur contained in the original sulfur dioxide feed. The technologies involved after the removal of entrained particles of melt are generally similar to those employed in Claus process plants which convert hydrogen sulfide to elemental sulfur. Typical reactions which occur in the catalytic reactors are:

$$COS + H_2O \rightarrow CO_2 + H_2S \tag{13}$$

$$CS_2 + 2H_2O \rightarrow CO_2 + 2H_2S \tag{14}$$

$$2H_2S + SO_2 \rightarrow 3S + 2H_2O \tag{15}$$

The carbonyl sulfide and carbon disulfide hydrolysis reactions, illustrated in Equations 13 and 14, proceed more rapidly at elevated temperatures, for example, at tempertures in the range of about 300° to 450° C., while the elemental sulfur formation reaction illustrated in Equation 15 proceeds quite rapidly at all practical catalyst temperatures and is favored by decreasing temperatures. It is therefore desirable to operate the first catalyst bed at high temperature, for example, above about 350° C. to assure the destruction of carbonyl sulfide and carbon disulfide and subsequent beds at temperatures which are as low as possible without condensing sulfur on the beds, for example, temperatures in the range of about 200° to 300° C.

Following the processing steps to recover sulfur, the remaining gases are removed by way of a stack, incinerator or absorber or further processed depending upon whether the carbon monoxide, carbon dioxide and nitrogen are to be recovered or disposed of as waste gases.

The other products of the reactions remain in the molten salt. These include sulfides, polysulfides, carbonates, sulfites and hydroxides, among others. Unreduced sulfates may also be present. Useful products may be separated from a stream drawn off from the molten salt reducer, if desired. Particularly, the molten alkali metal sulfide produced in the reduction reaction may be recovered by quenching and suitable processing and converted to a useful absorbent for removing sulfur dioxide from flue gas streams.

The invention will now be described with respect to one of its preferred embodiments by reference to the drawing.

A flue gas from which sulfur dioxide is to be absorbed is fed into an absorber 10 via a conduit 12. A suitable absorbent solution is also fed to absorber 10 via a conduit 14. Purified flue gas exits absorber 10 via a conduit 16 and the absorbate solution containing the absorbed sulfur dioxide exits absorber 10 via a conduit 18. The absorbate solution is then fed to a regenerator 20 via a conduit 22. In regenerator 20 the sulfur dioxide absorbed from the flue gas in absorber 10 is regenerated from the resulting absorbate. The regenerated sulfur dioxide is then fed to a molten salt reducer 24 via a conduit 26. The absorbate from which the sulfur dioxide has been regenerated in regenerator 20 exits regenerator 20 via a conduit 28. From conduit 28, the solution from which sulfur dioxide has been regenerated is divided into two streams, one of which is conducted back to the absorber via conduit 14 and the other to a dryer 32 via a conduit 34. The dried salts from dryer 32 are conducted to a feeder 36 via a conduit 38. Petroleum coke is added to feeder 36 via a conduit 40. The mixture of coke and salt from feeder 36 is fed to molten salt reducer 24 via a conduit 42. Air is heated in a heat exchanger 44 prior to being introduced into molten salt reducer 24 via a conduit 46. The air heated in heat exchanger 44 is furnished via a conduit 48, a blower 50 and a conduit 52. The air is heated in heat exchanger 44 by exchange of heat with the hot gaseous product stream from molten salt reducer 24 exiting via a conduit 54. The hot product gas stream is partially cooled and entrained melt particles are removed in heat exchanger 44. The product gas stream is then conducted to a condenser 56 via a conduit 58. In condenser 58 liquid sulfur is condensed from the product gas stream by means of cooling with water, which may become steam in the process, and is removed from condenser 56 via a conduit 60. The product gas stream from which liquid sulfur has been condensed is then conducted to a burner 62 via a conduit 64 for reheating from the temperature of sulfur condensation to the preferred temperature for catalytic reactions. Hydrogen sulfide is introduced into burner 62 via a conduit 66 and air is introduced into burner 62 via a conduit 68. In burner 62 the burning of the hydrogen sulfide by means of the air results in the generation of heat and the formation of sulfur dioxide is illustrated in Equation 16:

$$2H_2S + 3O_2 \rightarrow 2SO_2 + 2H_2O \qquad (16)$$

The reheated gaseous stream exits burner 62 via a conduit 70. Steam is introduced via a conduit 72 in order to provide a source of water, if required, for the hydrolysis of carbonyl sulfide to hydrogen sulfide as shown in Equation 13. The hydrogen sulfide reacts with sulfur dioxide present in the gas stream to form elemental sulfur as shown in Equation 15. Additional sulfur may be formed by the direct reaction of carbonyl sulfide with sulfur dioxide as illustrated in Equation 17:

$$2COS + SO_2 \rightarrow 3S + 2CO_2 \qquad (17)$$

Carbon disulfide may be similarly hydrolyzed or reacted with sulfur dioxide as illustrated in Equations 14 and 18, respectively:

$$CS_2 + SO_2 \rightarrow 3S + CO_2 \qquad (18)$$

These reactions take place in a catalytic converter 74 into which the gaseous product stream containing the product gas stream from which sulfur has been separated in condenser 56 as well as the products of combustion from burner 62 are conducted via a conduit 76. Converter 74 is operated at a temperature in the range of about 300° to 450° C. and preferably a temperature in the range of about 325° and 400° C. The product stream from converter 74 which has been enriched with sulfur is conducted to a condenser 78 via a conduit 80. Liquid sulfur is condensed and removed via a conduit 82. The gas stream from which the additional sulfur has been condensed is then conducted to a burner 84 via a conduit 86 and the previous steps are repeated in order to recover additional liquid sulfur product. Hydrogen sulfide is introduced into burner 84 via a conduit 88 and air is introduced into burner 84 via a conduit 90. The gas stream from burner 84 which is enriched in sulfur dioxide is conducted to a second converter 92 via a conduit 94. The product of converter 92 is removed to a condenser 96 via a conduit 98. Product liquid sulfur is removed from condenser 96 via a conduit 100. Product gases exit via a conduit 102 which leads to a stack, incinerator or absorber, depending upon the use to which the product gases are to be put.

A part of the molten salt from molten salt reducer 24 is periodically or continuously drawn off and introduced into a quench tank 104 via a conduit 106. Water or dilute solution for use in quench tank 104 is introduced via a conduit 108. Soluble salts including alkali metal sulfides in the melt dissolve in the quench tank liquid to form an aqueous solution which is then conducted to a stripper 110 via a conduit 112. Stripper 110 functions to strip hydrogen sulfide from the aqueous solution by contacting it with sulfur dioxide introduced via a conduit 114. The sulfur dioxide serves primarily to convert alkali metal sulfides to alkali metal sulfites and hydrogen sulfide as illustrated in Equation 19

$$M_2S + SO_2 + H_2O \rightarrow M_2SO_3 + H_2S \qquad (19)$$

where M is an alkali metal ion.

The stripped solution exits stripper 110 via a conduit 116 and is fed via conduit 22 to regenerator 20 for return to the sulfur dioxide absorption system. Hydrogen sulfide gas is removed from stipper 110 via a conduit 118.

The invention will be better understood by reference to the following examples which illustrate embodiments of the processes of this invention and should not be construed as limiting the scope thereof.

EXAMPLE 1

Petroleum coke of the composition given in Table 1 was fed continuously at the rate of 164 lb./hr. to a molten salt bath in an insulated reactor maintained at a temperature of 1011° C. Sulfur dioxide gas was introduced at a rate of 659 lb./hr., sodium sulfate crystals at a rate of 176 lb./hr. and oxygen gas at a rate of 50 lb./hr. The product gas, which had the composition shown in Table 2A, was released from the reactor at a rate of 920 lb./hr. The melt, which had the composition shown in Table 3A, was formed at the rate of 129 lb./hr.

EXAMPLE 2

The procedure of Example 1 was followed except that air was fed instead of oxygen gas at a feed rate of 334 lb./hr., the feed rate for petroleum coke was 178 lb./hr. and the temperature was 1018° C. Product gas having the composition shown in Table 2B was released at a rate of 1235 lb./hr. and the melt, which had the composition shown in Table 3B, was formed at the rate of 112 lb./hr.

TABLE 1

| PETROLEUM COKE COMPOSITION | |
|---|---|
| | Percent by Weight |
| Carbon | 87.9 |
| Hydrogen | 3.9 |
| Nitrogen | 2.2 |
| Sulfur | 2.1 |
| Oxygen | 1.3 |
| Ash | 1.6 |
| Moisture | 1.0 |

TABLE 1-continued

PETROLEUM COKE COMPOSITION

| | Percent by Weight |
|---|---|
| | 100.0 |

TABLE 2

PRODUCT GAS COMPOSITIONS

| | Volume (%) | |
|---|---|---|
| Component | A (Example 1) | B (Example 2) |
| CO | 5.3 | 3.9 |
| COS | 1.0 | 0.6 |
| $CO_2$ | 52.4 | 37.4 |
| $H_2$ | 0.7 | 0.6 |
| $H_2O$ | 11.4 | 9.1 |
| $H_2S$ | 3.9 | 2.4 |
| $N_2$ | 0.6 | 28.9 |
| $SO_2$ | 4.3 | 3.6 |
| $S_2$ | 20.0 | 13.1 |
| A | 0.0 | 0.4 |
| | 100.0 | 100.0 |

TABLE 3

MELT COMPOSITIONS

| | Percent by Weight | |
|---|---|---|
| Component | A (Example 1) | B (Example 2) |
| $Na_2SO_4$ | 52.0 | 26.7 |
| $Na_2S$ | 44.5 | 69.0 |
| Compounds derived from the ash | 3.5 | 4.3 |

It can be seen that the present invention provides a process in which a major fraction of the sulfur in the sulfur dioxide feed is converted to elemental sulfur, $S_2$, which leaves with the product gas. It can also be seen that a substantial fraction of the melt is converted from sodium sulfate to sodium sulfide during the course of the reduction process.

It will, of course, be realized that various modifications can be made in the design and operation of the present invention without departing from the spirit thereof. For example, the various feeds for the molten salt reducer may be derived from other process streams than those specifically illustrated, a different type of molten salt reducer other than the bath type illustrated may be used, the elemental sulfur produced in the molten salt reducer may be processed otherwise than as specifically described above, or the melt withdrawn from the molten salt reducer may be regenerated by means of carbon dioxide following quenching. Thus, while the principle, preferred design, and mode of operation of the invention have been explained and what is now considered to represent its best embodiment has been illustrated and described, it should be understood that, within the scope of the appended claims, the invention can be practiced otherwise than as specifically illustrated and described.

What is claimed is:

1. A process for simultaneously reducing sulfur dioxide to elemental sulfur and an alkali metal sulfate to an alkali metal sulfide which comprises:

providing a reaction zone containing a molten salt comprising an alkali metal sulfide;

introducing into said reaction zone gaseous sulfur dioxide, solid alkali metal sulfate, solid carbonaceous material and oxygen;

reacting the sulfur dioxide and carbonaceous material to produce gaseous elemental sulfur and gaseous sulfur compounds;

reacting the alkali metal sulfate and carbonaceous material to produce an alkali metal sulfide;

withdrawing a gaseous product stream containing elemental sulfur, gaseous sulfur compounds, carbon dioxide and carbon monoxide from said reaction zone;

cooling said gaseous product stream to condense elemental sulfur therefrom;

reheating said gaseous product stream from which sulfur has been condensed and passing it through a catalyst bed to convert a portion of said gaseous sulfur compounds into elemental sulfur;

condensing additional elemental sulfur from the converted gaseous product stream;

repeating the reheating, catalytic conversion and sulfur condensation steps to provide a gas containing less than about 15% of the sulfur contained in the original sulfur dioxide feed;

removing a portion of the molten salt from said reaction zone; and quenching said removed molten salt in an aqueous bath to produce a solution comprising an alkali metal sulfide;

said oxygen being introduced into said reaction zone in an amount sufficient to maintain the temperature of the reaction zone above the melting point of the salts contained therein by oxidizing a portion of said carbonaceous material, but not sufficient to also oxidize the carbonaceous material required for the reduction of sulfur dioxide to elemental sulfur and the reduction of the alkali metal sulfate to alkali metal sulfide.

2. A process according to claim 1 wherein the alkali metal sulfate is fed from a flue gas desulfurization system in which sulfur dioxide is absorbed by an aqueous alkali metal sulfite solution to produce a sulfur dioxide absorbate and wherein the sulfur dioxide gas is produced by regeneration of said absorbate.

3. A process according to claim 2 wherein the alkali metal sulfide solution recovered from the molten salt is further processed and recycled to said flue gas desulfurization system.

4. A process according to claim 1 wherein the molten salt comprises sodium sulfide.

5. A process according to claim 1 wherein the molten salt comprises a mixture of sodium sulfide and potassium sulfide.

6. A process according to claim 1 wherein the alkali metal sulfate comprises sodium sulfate.

7. A process according to claim 1 wherein an alkali metal thiosulfate is also introduced into said reaction zone.

8. A process according to claim 7 wherein the alkali metal thiosulfate comprises sodium thiosulfate.

9. A process according to claim 1 wherein the carbonaceous material is petroleum coke.

10. A process according to claim 2 wherein the portion of molten salt removed from said reaction zone is quenched by means of water and the resulting quenched melt comprising an alkali metal sulfide solution is treated with sulfur dioxide to strip hydrogen sulfide therefrom and to regenerate an alkali metal sulfite and the regenerated alkali metal sulfite is recycled to said flue gas desulfurization system.

11. A process for flue gas desulfurization which comprises:

absorbing sulfur dioxide from a flue gas into an aqueous solution containing alkali metal salts which are active for sulfur dioxide absorption;

regenerating sulfur dioxide in gaseous form from the absorbent to produce a sulfur dioxide stream;

withdrawing a portion of the aqueous alkali metal absorbent containing alkali metal sulfate, which is not active for absorbing sulfur dioxide;

feeding said sulfur dioxide stream, said alkali metal sulfate, a carbonaceous material, and oxygen gas into a reaction zone containing a molten salt;

reacting said oxygen gas with one portion of said carbonaceous material to produce gaseous combustion products and provide sufficient heat to maintain the temperature of said reaction zone above that required to melt the salts therein;

reacting said sulfur dioxide gas with a second portion of said carbonaceous material to produce elemental sulfur in gaseous form and other gaseous sulfur compounds;

reacting said alkali metal sulfate with a third portion of said carbonaceous material to produce alkali metal sulfide in molten form and gaseous reaction products;

withdrawing a gaseous product stream from said reaction zone containing said combustion products, gaseous elemental sulfur, other gaseous sulfur compounds, and gaseous reaction products;

processing said gaseous product stream by sulfur condensation and catalytic conversion steps to produce a liquid elemental sulfur product;

withdrawing a molten salt stream containing alkali metal sulfide from said reaction zone;

processing said alkali metal sulfide to produce hydrogen sulfide gas and a solution of alkali metal salts which are active for sulfur dioxide absorption; and returning the active salts to the solution used for absorbing sulfur dioxide from said flue gas.

12. A process according to claim 11 wherein said reaction zone temperature is in the range of about 850° to 1250° C.

* * * * *